United States Patent
Matsuzaki

(10) Patent No.: US 9,503,596 B2
(45) Date of Patent: Nov. 22, 2016

(54) IMAGE FORMING APPARATUS HAVING A SHIFT POSITION OBTAINING UNIT

(71) Applicant: FUJI XEROX CO., LTD., Tokyo (JP)

(72) Inventor: Yoshiki Matsuzaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/625,126

(22) Filed: Feb. 18, 2015

(65) Prior Publication Data

US 2015/0271351 A1 Sep. 24, 2015

(30) Foreign Application Priority Data

Mar. 18, 2014 (JP) ................................ 2014-055487

(51) Int. Cl.
*H04N 1/00* (2006.01)

(52) U.S. Cl.
CPC ...... *H04N 1/00779* (2013.01); *H04N 1/00702* (2013.01); *H04N 2201/0094* (2013.01)

(58) Field of Classification Search
None
See application file for complete search history.

(56) References Cited

U.S. PATENT DOCUMENTS

| 7,502,147 B2 * | 3/2009 | Suzuki | H04N 1/00002 358/405 |
| 7,548,326 B2 * | 6/2009 | Fukushima | H04N 1/00002 347/116 |
| 7,957,659 B2 | 6/2011 | Nada et al. | |
| 8,160,361 B2 * | 4/2012 | Boness | B41F 33/0081 358/406 |
| 2003/0098985 A1 * | 5/2003 | Horobin | H04N 1/00002 358/1.9 |
| 2009/0147298 A1 * | 6/2009 | Takahashi | H04N 1/6033 358/1.15 |

FOREIGN PATENT DOCUMENTS

JP 2009-128757 A 6/2009

* cited by examiner

*Primary Examiner* — Thomas D Lee
(74) *Attorney, Agent, or Firm* — Sughrue Mion, PLLC

(57) ABSTRACT

An image forming apparatus includes an obtaining unit that obtains image information for forming a confirmation image, a state of formation of the confirmation image at a peripheral portion of a recording medium when an image formation position with respect to the recording medium is a predetermined position differing from a state of formation of the confirmation image at the peripheral portion of the recording medium when the image formation position is shifted from the predetermined position; and a forming section that, when ascertaining the shift of the image formation position from the predetermined position, performs an image forming process using the image information obtained by the obtaining unit.

8 Claims, 10 Drawing Sheets

| SHEET CONDITION | | FIRST CONFIRMATION IMAGE | SECOND CONFIRMATION IMAGE | |
|---|---|---|---|---|
| SIZE | VERTICAL/ HORIZONTAL | IMAGE INFORMATION | IMAGE INFORMATION | LENGTH WITHIN SHEET |
| A4 | HORIZONTAL | (KDA4Y1) | (KDA4Y2) | r1 |
| A4 | VERTICAL | (KDA4T1) | (KDA4T2) | r1 |
| A3 | HORIZONTAL | (KDA3Y1) | (KDA3Y2) | r2 |
| A3 | VERTICAL | (KDA3T1) | (KDA3T2) | r2 |
| ⋮ | ⋮ | ⋮ | ⋮ | ⋮ |

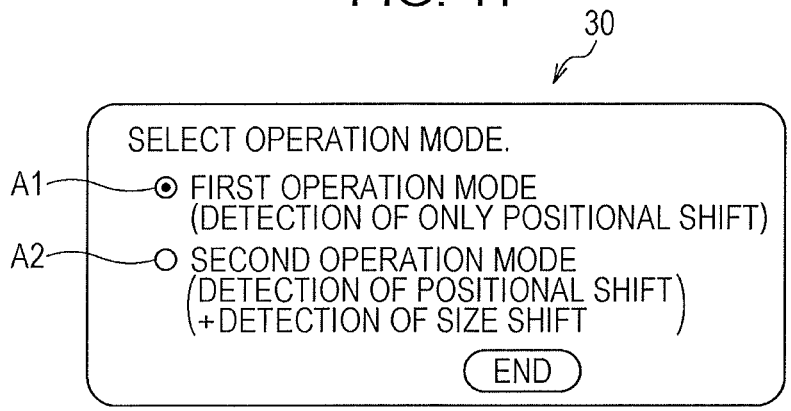
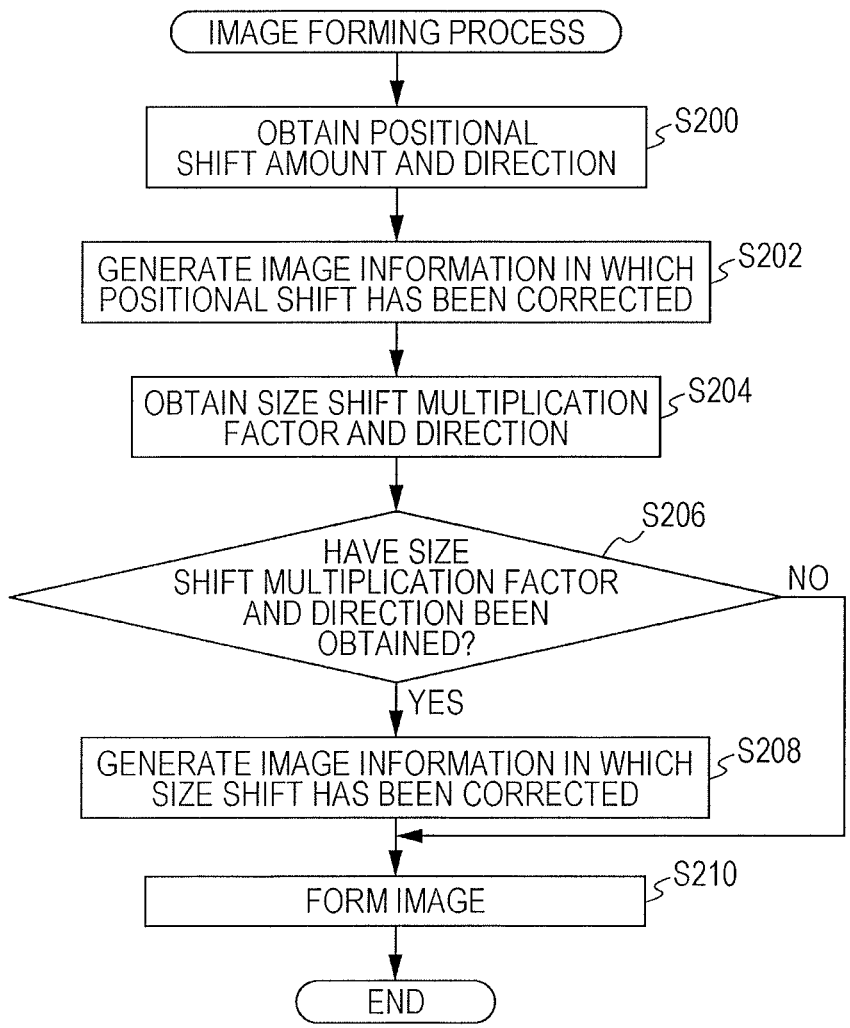

IMAGE FORMING APPARATUS HAVING A SHIFT POSITION OBTAINING UNIT

CROSS-REFERENCE TO RELATED APPLICATIONS

This application is based on and claims priority under 35 USC 119 from Japanese Patent Application No. 2014-055487 filed Mar. 18, 2014.

BACKGROUND

Technical Field

The present invention relates to an image forming apparatus.

SUMMARY

According to an aspect of the invention, there is provided an image forming apparatus includes an obtaining unit that obtains image information for forming a confirmation image, a state of formation of the confirmation image at a peripheral portion of a recording medium when an image formation position with respect to the recording medium is a predetermined position differing from a state of formation of the confirmation image at the peripheral portion of the recording medium when the image formation position is shifted from the predetermined position; and a forming section that, when ascertaining the shift of the image formation position from the predetermined position, performs an image forming process using the image information obtained by the obtaining unit.

BRIEF DESCRIPTION OF THE DRAWINGS

Exemplary embodiments of the present invention will be described in detail based on the following figures, wherein:

FIG. 11 is a front view of an example of an operation mode selection screen according to the exemplary embodiment of the present invention;

FIG. 12 is a flowchart of steps of an image formation program according to the exemplary embodiment of the present invention;

DETAILED DESCRIPTION

Exemplary embodiments of the present invention are hereunder described in detail with reference to the drawings. Here, the present invention is applied to what is called a tandem image forming apparatus using an electrophotographic system.

Figure 1:
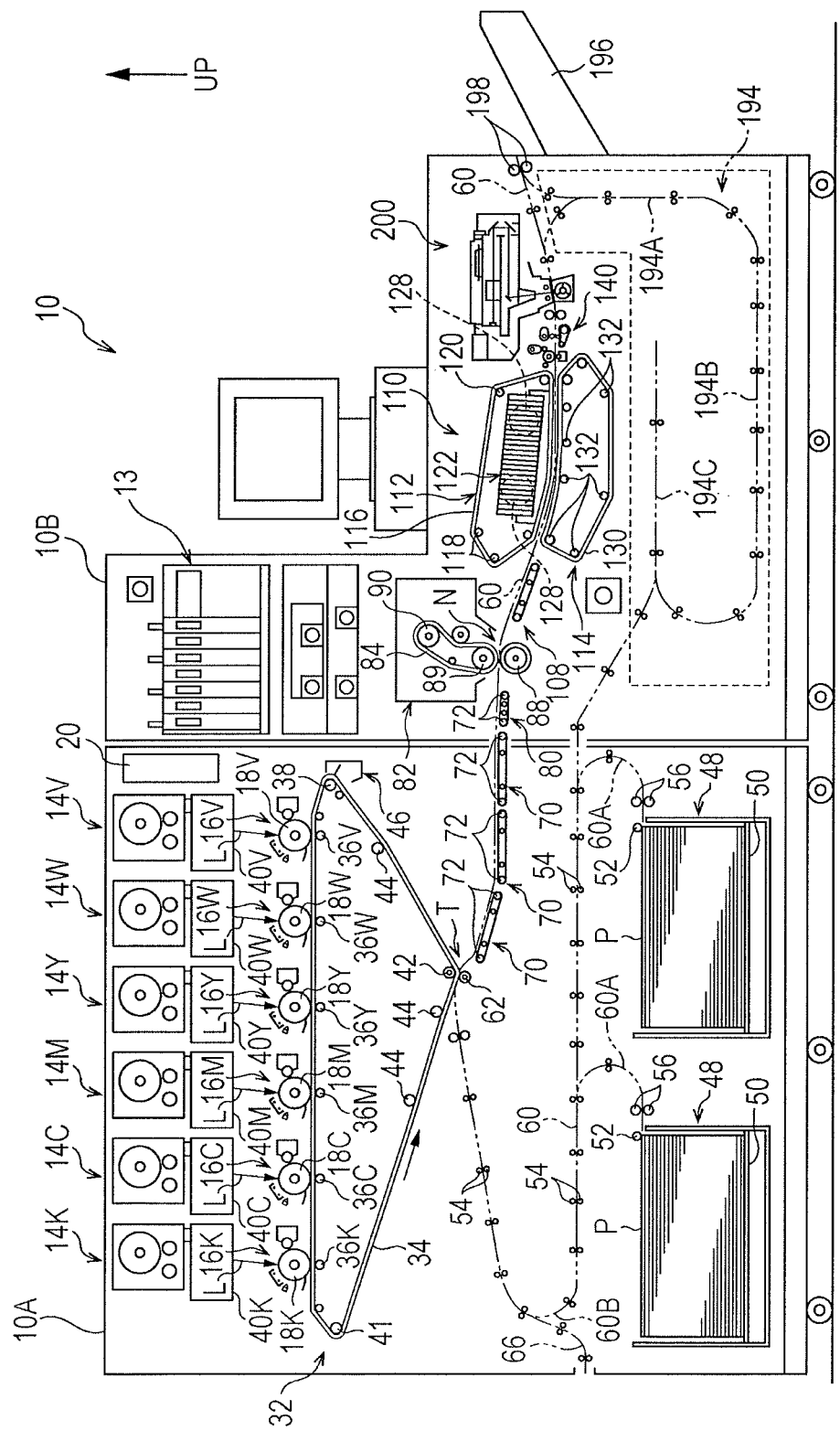
FIG. 1 is a schematic structural view (cutaway side view) of an image forming apparatus according to an exemplary embodiment of the present invention.
Figure 2:
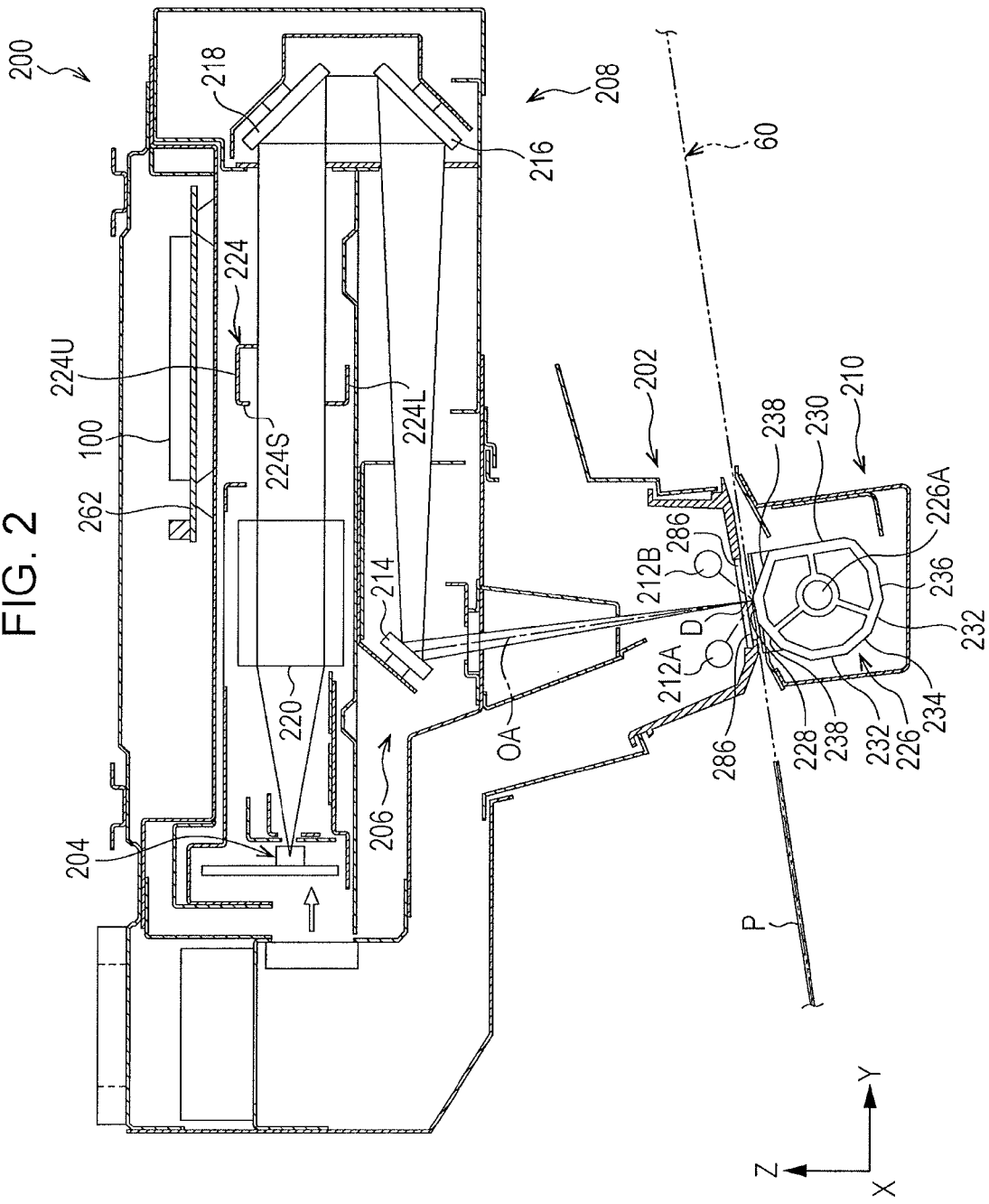
FIG. 2 is a schematic structural view (cutaway side view) of an in-line sensor provided at the image forming apparatus according to the exemplary embodiment of the present invention.

FIG. 1 is a schematic structural view of an image forming apparatus 10 according to an exemplary embodiment of the present invention. FIG. 2 is a schematic structural view of an in-line sensor (trade name) provided at the image forming apparatus 10 according to the exemplary embodiment of the present invention.

The image forming apparatus 10 according to the exemplary embodiment forms a full-color image or a monochrome image. As shown in FIG. 1, the image forming apparatus 10 includes a first housing 10A which forms a portion of the image forming apparatus 10 at one side (left side in FIG. 1) in a horizontal direction and which accommodates a first processor. In addition, the image forming apparatus 10 includes a second housing 10B which is separably connected to the first housing 10A, which forms a portion of the image forming apparatus 10 at the other side (right side in FIG. 1) in the horizontal direction, and which accommodates a second processor.

An image signal processor 13 that processes image data that is sent from an external device, such as a computer, is provided at a top portion of the second housing 10B.

Toner cartridges 14V, 14W, 14Y, 14M, 14C, and 14K are replaceably provided at a top portion of the first housing 10A along the horizontal direction. The toner cartridges 14V, 14W, 14Y, 14M, 14C, and 14K contain toners of respective colors, that is, a first special color (V), a second special color (W), yellow (Y), magenta (M), cyan (C), and black (K).

As the first special color and the second special color, any colors (including transparent colors) other than yellow, magenta, cyan, and black are selected as appropriate. In the description below, when component parts are to be distinguished in terms of the first special color (V), the second special color (W), yellow (Y), magenta (M), cyan (C), and black (K), the component parts are described by adding the letters V, W, Y, M, C, and K after the reference numerals. When component parts are not to be distinguished in terms of the first special color (V), the second special color (W), yellow (Y), magenta (M), cyan (C), and black (K), for describing the component parts, the component parts are described without adding the letters V, W, Y, M, C, and K after the reference numerals.

Six image forming units 16 (16V, 16W, 16Y, 16M, 16C, and 16K) corresponding to the toners of the respective colors are provided below the toner cartridges 14 so as to be positioned in the horizontal direction in correspondence with the respective toner cartridges 14.

Exposure devices 40 (40V, 40W, 40Y, 40M, 40C, and 40K) that are provided at the respective image forming units 16 receive image data processed by the image signal processor 13 from the image signal processor 13. The exposure devices 40 irradiate image holding members 18 (18V, 18W, 18Y, 18M, 18C, and 18K) (described later) with light beams L modulated in accordance with the received image data.

Each image forming unit 16 includes the corresponding image holding member 18 that is rotationally driven in one direction. By applying the light beams L to the respective image holding members 18 from the respective exposure devices 40, electrostatic latent images are formed on the respective image holding members 18.

A scorotron charger and a developing device are provided around each image holding member 18. Each scorotron charger is a corona discharge type (non-contact charging type) that charges the corresponding image holding member 18. Each developing device develops, using developer, the electrostatic latent image formed on the corresponding image holding member 18 by the corresponding exposure device 40. A blade and an electricity removing device are also provided around each image holding member 18. Each blade removes any developer remaining on the corresponding image holding member 18 after transfer. Each electricity removing device removes electricity by applying light to the corresponding image holding member 18 after the transfer. The scorotron chargers, the respective developing devices, the respective blades, and the respective electricity removing devices are disposed in that order from an upstream side to a downstream side in a direction of rotation of the respective image holding members 18 so as to oppose surfaces of the respective image holding members 18.

A transfer section 32 is provided below the image forming units 16. The transfer section 32 includes an annular intermediate transfer belt 34 and first transfer rollers 36. The annular intermediate transfer belt 34 contacts each image holding member 18. The first transfer rollers 36 cause toner images formed on the respective image holding members 18 to be superimposed upon and transferred to the intermediate transfer belt 34.

The intermediate transfer belt 34 is wound upon a driving roller 38, which is driven by a motor (not shown), a tension applying roller 41, which applies tension to the intermediate transfer belt 34, an opposing roller 42, which opposes a second transfer roller 62 (described later), and wind rollers 44. The intermediate transfer belt 34 is circulated in one direction (counterclockwise in FIG. 1) by the driving roller 38.

The first transfer rollers 36 oppose the image holding members 18 of the respective image forming units 16 with the intermediate transfer belt 34 being disposed therebetween. A power supply unit (not shown) applies a transfer bias voltage having a polarity that is opposite to the polarity of the toners to the first transfer rollers 36. This structure allows the toner images formed on the respective image holding members 18 to be transferred to the intermediate transfer belt 34.

A removing device 46 is provided opposite to the driving roller 38 with the intermediate transfer belt 34 being disposed therebetween. The removing device 46 removes, for example, any residual toner or paper dust on the intermediate transfer belt 34 by causing a blade to contact the intermediate transfer belt 34.

Two recording medium containers 48 that contain sheets P, serving as exemplary recording media, are provided below the transfer section 32 so as to be disposed in the horizontal direction.

Each recording medium container 48 is capable of being drawn out from the first housing 10A. A feeding roller 52 is provided at an upper portion at one side (right side in FIG. 1) of its corresponding recording medium container 48. The feeding rollers 52 feed sheets P from the respective recording medium containers 48 to a transport path 60.

A bottom plate 50 on which the sheets P are placed is provided in each recording medium container 48. When the recording medium containers 48 are drawn out from the first housing 10A, the respective bottom plates 50 are lowered on the basis of an instruction of a controller 20 (described later). When the bottom plates 50 are lowered, spaces allowing a user to replenish the recording medium containers 48 with sheets P are formed at the recording medium containers 48.

When the recording medium containers 48 that have been drawn out from the first housing 10A are mounted on the first housing 10A, the respective bottom plates 50 are raised on the basis of an instruction of the controller 20. When the bottom plates 50 are raised, the respective feeding rollers 52 and topmost sheets P on the bottom plates 50 contact each other.

Separating rollers 56 are provided downstream in a transport direction of a sheet P (hereunder may also be simply referred to as "downstream") from each feeding roller 52. The separating rollers 56 separate one by one superimposed sheets P that have been fed from each recording medium container 48. Transport rollers 54 that transport sheets P downstream are provided downstream from the separating rollers 56.

The transport path 60 is provided between the transfer section 32 and each recording medium container 48. The transport path 60 extends to a transfer position T, which is situated between the second transfer roller 62 and the opposing roller 42, such that sheets P that have been fed from the associated recording medium containers 48 turn around towards the left in FIG. 1 at associated first turn-around sections 60A and turn around towards the right in FIG. 1 at a second turn-around section 60B.

A power supply unit applies a transfer bias voltage having a polarity that is opposite to the polarity of the toners to the second transfer roller 62. By virtue of this structure, the toner images of the respective colors that have been superimposed upon and transferred to the intermediate transfer belt 34 are second-transferred to a sheet P that has been transported along the transport path 60.

A preliminary path 66 extending from a side surface of the first housing 10A is provided so as to merge with the second turn-around section 60B of the transport path 60. A sheet P that has been fed from a different recording medium container (not shown), which is disposed adjacent to the first housing 10A, enters the transport path 60 via the preliminary path 66.

Transport belts 70 are provided at the first housing 10A so as to be positioned downstream from the transfer position T. The transport belts 70 transport the sheet P to which the toner images have been transferred towards the second housing 10B. A transport belt 80 is provided at the second housing 10B so as to be positioned downstream from the transfer position T. The transport belt 80 transports downstream the sheet P that has been transported by the transport belts 70.

The transport belts 70 and the transport belt 80 are annular in shape, and are each wound upon a pair of wind rollers 72. The wind rollers 72 of each pair are disposed at an upstream side and a downstream side in the transport direction of a sheet P, respectively. By rotationally driving one of the wind rollers 72 of each pair, the corresponding transport belt 70 (the transport belt 80) is circulated in one direction (clockwise in FIG. 1).

A fixing unit 82 is provided downstream from the transport belt 80. Using heat and pressure, the fixing unit 82 fixes the toner images that have been transferred to a surface of the sheet P to the sheet P.

The fixing unit 82 includes a fixing belt 84 and a pressure roller 88, disposed so as to contact a lower side of the fixing belt 84. A fixing section N, where the sheet P is pressed and heated to fix the toner images thereto, is formed between the fixing belt 84 and the pressure roller 88.

The fixing belt 84 has an annular in shape, and is wound upon a driving roller 89 and a driven roller 90. The driving roller 89 opposes the pressure roller 88 from an upper side. The driven roller 90 is disposed above the driving roller 89.

A heating unit, such as a halogen heater, is built in each of the driving roller 89 and the driven roller 90. The heating units heat the fixing belt 84.

A transport belt 108 is provided downstream from the fixing unit 82. The transport belt 108 transports downstream the sheet P that has been sent out from the fixing unit 82. The transport belt 108 is formed in the same way as the transport belts 70.

A cooling unit 110 is provided downstream from the transport belt 108. The cooling unit 110 cools the sheet P that has been heated by the fixing unit 82.

The cooling unit 110 includes an absorbing device 112, which absorbs the heat of the sheet P, and a pressing device 114, which presses the sheet P against the absorbing device 112. The absorbing device 112 is disposed on one side of the transport path 60 (upper side in FIG. 1), and the pressing device 114 is disposed on the other side of the transport path 60 (lower side in FIG. 1).

The absorbing device 112 includes an annular absorbing belt 116 that contacts the sheet P and that absorbs the heat of the sheet P. The absorbing belt 116 is wound upon a driving roller 120 and wind rollers 118. The driving roller 120 transmits driving force to the absorbing belt 116.

A heat sink 122 is provided at an inner peripheral side of the absorbing belt 116. The heat sink 122 is formed of an aluminum material that dissipates the heat absorbed by the absorbing belt 116 by contacting the absorbing belt 116 at a surface thereof.

A fan 128 is disposed at a back side (far side in FIG. 1) of the second housing 10B. The fan 128 takes away the heat from the heat sink 122 and discharges hot air to the outside.

The pressing device 114 includes an annular pressing belt 130 that transports the sheet P while pressing the sheet P against the absorbing belt 116. The pressing belt 130 is wound upon wind rollers 132.

A straightening device 140 is provided downstream from the cooling unit 110. The straightening device 140 sandwiches and transports the sheet P and straightens the sheet P.

An in-line sensor 200 is provided downstream from the straightening device 140. The in-line sensor 200 detects, for example, improper image positions, image defects, and improper toner densities of the toner images fixed to the sheet P. The structure of the in-line sensor 200 is described in detail below.

Discharge rollers 198 are provided downstream from the in-line sensor 200. The discharge rollers 198 discharge the sheet P on whose one surface the images are formed to a discharge unit 196. The discharge unit 196 is mounted on a side surface of the second housing 10B.

When images are to be formed on both surfaces of a sheet P, a sheet P that has been sent from the in-line sensor 200 is transported to a reverse path 194, provided downstream from the in-line sensor 200.

The reverse path 194 includes a branched path 194A and a sheet transport path 194B. The branched path 194A is branched from the transport path 60. The sheet transport path 194B allows the sheet P that is transported along the branched path 194A to be transported towards the first housing 10A. The reverse path 194 also includes a reverse path section 194C that causes the sheet P that is transported along the sheet transport path 194B to turn around towards an opposite direction, to be redirected, and to have its front and back surfaces reversed.

By virtue of this structure, the sheet P that has been redirected at the reverse path section 194C is transported towards the first housing 10A, enters the transport path 60 (provided above the recording medium containers 48), and are sent again to the transfer position T.

Next, an image formation process performed by the image forming apparatus 10 according to the exemplary embodiment is described.

Image data that has been processed by the image signal processor 13 is transmitted to each exposure device 40. The exposure devices 40 emit the light beams L that are in accordance with the image data, and expose the respective image holding members 18 charged by the respective scorotron chargers, so that electrostatic latent images are formed on the respective image holding members 18.

The electrostatic latent images formed on the respective image holding members 18 are developed by the respective developing devices, so that the toner images of respective colors, that is, the first special color (V), the second special color (W), yellow (Y), magenta (M), cyan (C), and black (K) are formed.

The toner images of the respective colors formed on the image holding members 18 of the respective image forming units 16V, 16W, 16Y, 16M, 16C, and 16K are successively superimposed upon and transferred to the intermediate transfer belt 34 by the six respective first transfer rollers 36V, 36W, 36Y, 36M, 36C, and 36K.

The second transfer roller 62 second-transfers the toner images of the respective colors superimposed upon and transferred to the intermediate transfer belt 34 to a sheet P that has been transported from a recording medium container 48. The sheet P to which the toner images have been transferred is transported towards the fixing unit 82 (provided in the second housing 10B) by the transport belts 70.

The fixing unit 82 heats and presses the toner images of the respective colors on the sheet P to fix the toner images to the sheet P. Further, the sheet P to which the toner images have been fixed passes through the cooling unit 110 and is cooled. Then, the cooled sheet P is sent into the straightening device 140, and is straightened.

After detection of, for example, an image defect by the in-line sensor 200, the straightened sheet P is discharged to the discharge unit 196 by the discharge rollers 198.

When images are to be formed on a non-image surface (back surface) of the sheet P where images are not formed (that is, when double-sided printing is to be performed), after the sheet P has passed the in-line sensor 200, the sheet P is reversed at the reverse path 194. Then, the reversed sheet P is sent into the transport path 60 (provided above the recording medium containers 48), and toner images are formed on the back surface of the sheet P by the above-described procedure.

In the image forming apparatus 10 according to the exemplary embodiment, component parts for forming an image of the first special color and an image of the second special color (that is, the image forming units 16V and 16W, the exposure devices 40V and 40W, the toner cartridges 14V and 14W, and the first transfer rollers 36V and 36W) are mountable on the first housing 10A as additional component parts by selection by a user. Therefore, the image forming apparatus 10 may have a structure that does not include the component parts for forming images of the first and second special colors, or may have a structure including only one of the component part for forming an image of the first special color and the component part for forming an image of the second special color.

Next, the structure of the in-line sensor 200 according to the exemplary embodiment is described in detail with reference to FIG. 2. In the description below, a far-side direction (main scanning direction) of the image forming apparatus 10 is defined as a direction X, a length direction (subscanning direction corresponding to the transport direction of a sheet P) of the image forming apparatus 10 is defined as a direction Y, and a height direction of the image forming apparatus 10 is defined as a direction Z.

As shown in FIG. 2, the in-line sensor 200 according to the exemplary embodiment includes an illuminating unit 202 that applies light towards a sheet P on which images are formed. The in-line sensor 200 also includes an imaging unit 208 provided with an imaging optical system 206 that causes light emitted from the illuminating unit 202 and reflected by the sheet P to be focused on a charge coupled device (CCD) sensor 204. The in-line sensor 200 further includes a setting unit 210 where, for example, various references during use of the in-line sensor 200 or during calibration are provided. Although, in the in-line sensor 200 according to the exemplary embodiment, a line sensor is used as the CCD sensor 204, the CCD sensor 204 is not limited thereto. An area sensor may be used as the CCD sensor 204.

The illuminating unit 202 is disposed above the transport path 60 of a sheet P, and includes a pair of lamps 212. Each lamp 212 is a xenon lamp which is long in the direction X. The illumination range is longer than the width of a largest sheet P that is transported. The lamps 212 are symmetrically disposed with respect to an optical axis OA (in terms of design) for light that is reflected by a sheet P and that travels towards the imaging unit 208. More specifically, the lamps 212 are symmetrically disposed with respect to the optical axis OA so that illumination angles of light with respect to the sheet P become 45 degrees to 50 degrees.

More specifically, the lamps 212 are disposed side by side along the transport path 60 of the sheet P. The lamps 212 correspond to a first lamp 212A and a second lamp 212B. The first lamp 212A is a light source that is disposed at the upstream side in the transport direction of the sheet P. The second lamp 212B is a light source that is disposed downstream from the first lamp 212A in the transport direction of the sheet P. The lamps 212 are formed so that light from the first lamp 212A and light from the second lamp 212B are applied to an illumination position D in the transport path 60 between the first lamp 212A and the second lamp 212B.

The imaging optical system 206 includes a first mirror 214 and a second mirror 216 as principal components. Light guided along the optical axis OA is reflected by the first mirror 214 in the direction Y (that is, downstream in the transport direction of the sheet P in the exemplary embodiment). The second mirror 216 upwardly reflects the light reflected by the first mirror 214. The imaging optical system 206 further includes a third mirror 218 and a lens 220 as principal components. The light reflected by the second mirror 216 is reflected upstream in the transport direction of the sheet P by the third mirror 218. The light reflected by the third mirror 218 is condensed (focused) by the CCD sensor 204. The CCD sensor 204 is disposed upstream from the optical axis OA in the transport direction of the sheet P.

The length of the first mirror 214 in the direction X is larger than the width of a largest sheet P. The first mirror 214 to the third mirror 218 reflect lights reflected from the sheet P and incident upon the imaging optical system 206 while narrowing (condensing) the lights in the direction X (that is, the main scanning direction). This allows the imaging optical system 206 to cause the light reflected from each portion of the sheet P in a width direction to be incident upon the substantially cylindrical lens 220.

By virtue of the above-described structure, in the in-line sensor 200 according to the exemplary embodiment, the CCD sensor 204 outputs (feed backs) focused light, that is, a signal in accordance with image density, to the controller 20 (see FIG. 1) of the image forming apparatus 10. On the basis of the signal from the in-line sensor 200, the controller 20 corrects the images that are formed by the image forming units 16. In the image forming apparatus 10 according to the exemplary embodiment, in an example, the intensity of illumination light from each exposure device 40 is corrected on the basis of the signal from the in-line sensor 200.

Diaphragms 224 (224L, 224S, 224U) are provided between the third mirror 218 and the lens 220 of the imaging optical system 206. The diaphragms 224 reduce in the direction Z (that is, in a direction that intersects the main scanning direction) the quantity of light which traverses an optical path in the direction X and which is focused on the CCD sensor 204. The diaphragms 224 are also capable of adjusting the amount by which the quantity of light is reduced by an external operation. Even if the light emission amount of each lamp 212 changes with the passage of time, the amount by which the light quantity is reduced by each diaphragm 224 is adjusted so that the light quantity that is focused on the CCD sensor 204 becomes greater than or equal to a predetermined quantity.

The setting unit 210 includes a reference roller 226 that is long in the direction X. The reference roller 226 has a detection reference surface 228 and a retreating surface 230. The detection reference surface 228 is caused to face the transport path 60 when detecting an image on a sheet P. The retreating surface 230 is caused to face the transport path 60 when detection of an image on a sheet P is not performed. The reference roller 226 further has a white reference surface 232, a color reference surface 234, and a multiple inspection surface 236. Patterns of multiple colors are formed on the color reference surface 234 in a longitudinal direction thereof. Multiple inspection patterns are formed on the multiple inspection surface 236. In the exemplary embodiment, the reference roller 226 is formed into a polygonal cylinder having eight or more surfaces in a circumferential direction. Further, in the exemplary embodiment, the detection reference surface 228, the retreating surface 230, the color reference surface 234, and the multiple inspection surface 236 are each formed on only one side of the reference roller 226. Two of the white reference surfaces 232 are provided on two sides of the reference roller 226.

By rotating the reference roller 226 around a rotation axis 226A, switching between surfaces that face the transport path 60 is performed. The switching between surfaces of the reference roller 226 is performed by a control circuit 100 that is provided on a circuit board 262. By forming the reference roller 226 into a polygonal cylinder having 8 or more sides, the difference between the distance from a peripheral-direction center of each surface to a rotation center and the distance from each corner, provided between corresponding surfaces, to the rotation center is small. This prevents the corners between the corresponding surfaces of the reference roller 226 from interfering with the illuminating unit 202 while the distance between each surface of the reference roller 226 and the light illumination position (a window glass 286 (described later)) of each lamp 212 is reduced.

The width of the detection reference surface 228 in the peripheral direction is smaller than the widths of the other surfaces. Guide surfaces 238 that do not function as any of the aforementioned references are provided on two sides of the detection reference surface 228 in the peripheral direction thereof. The detection reference surface 228 is a position reference surface for positioning a detection (reading) surface of a sheet P that is transported to the illumination position of each lamp 212.

The width of the retreating surface 230 in a peripheral direction is larger than the widths of the other surfaces. When image detection of a sheet P using the in-line sensor 200 is not performed, the retreating surface 230 is a guide surface that guides the sheet P, with the distance between the retreating surface 230 and rotation axis 226A being smaller than the distance between the detection reference surface 228 and the rotation axis 226A. Accordingly, when image detection of a sheet P using the in-line sensor 200 is not performed, there is formed a transport path whose distance from the illuminating unit 202 (the window glass 286) is larger than that when image detection of a sheet P using the in-line sensor 200 is performed.

The white reference surface 232 is provided for calibration of the illuminating unit 202 and the imaging optical system 206. A reference white film used for outputting a predetermined signal from the CCD sensor 204 is attached to the white reference surface 232. The color reference surface 234 is also provided for calibration of the illuminating unit 202 and the imaging optical system 206. A film having a reference-color pattern and used for outputting a predetermined signal from the CCD sensor 204 in accordance with each color is attached to the color reference surface 234.

A position adjustment pattern, a focus detection pattern, and a depth detection pattern are formed on the same side of the multiple inspection surface 236. The position adjustment pattern, the focus detection pattern, and the depth detection pattern are provided for calibration of a detection position that is detected by the CCD sensor 204 in a direction of rotation of the reference roller 226 (that is, the transport direction of the sheet P).

Next, calibrations of the in-line sensor 200 according to the exemplary embodiment are described.

In the exemplary embodiment, as calibrations of the in-line sensor 200, offset and gain adjustments and shading corrections are performed. The offset and gain adjustments are performed for adjusting an upper limit and a lower limit of an output signal from the CCD sensor 204. The shading corrections are performed for correcting an illumination distribution of a reading image on the basis of a profile of the reading image with respect to the white reference surface 232. In the exemplary embodiment, as calibrations of the in-line sensor 200, adjustments of a detection position detected by the CCD sensor 204 in the transport direction of a sheet P and confirmation of the illumination depth and the focus of the CCD sensor 204 are also performed. Further, in the exemplary embodiment, as a calibration of the in-line sensor 200, for example, CCD calibration for reading the pattern having a reference color on the color reference surface 234 and correcting a reading value of the CCD sensor 204 is performed.

In an exemplary procedure of the calibrations, for example, first, the white reference surface 232 is caused to face the transport path 60 of a sheet P. On the basis of the result of reading the white reference surface 232 by the CCD sensor 204, the offset and gain adjustments are performed. Thereafter, on the basis of the result of reading the white reference surface 232, the shading correction is performed for correcting a distribution of light quantity in the direction X (main scanning direction).

Next, the multiple inspection surface 236 is caused to face the transport path 60 of the sheet P. On the basis of the position adjustment pattern, the detection position that is detected by the CCD sensor 204 in the transport direction of the sheet P is adjusted.

Then, the focus of the CCD sensor 204 is confirmed on the basis of the focus detection pattern, and the illumination depth of the CCD sensor 204 is confirmed on the basis of the depth detection pattern.

Further, the color reference surface 234 is caused to face the transport path 60 of the sheet P. On the basis of the result of reading the color reference surface 234 by the CCD sensor 204, the reading value of the CCD sensor 204 is corrected so that a predetermined signal is output for each color.

In the exemplary embodiment, a suitable timing in which calibrations of the in-line sensor 200 are executed corresponds to a timing in which a power switch of the image forming apparatus 10 is turned on. However, the suitable timing is not limited thereto. For example, a timing in which the calibrations are executed may be a timing in which, each time a job (one image forming process) is completed, an instruction for starting the calibrations is received. In one job, images are formed on the number of sheets P that is greater than or equal to a predetermined number of sheets P (such as 1000 sheets P).

Figure 3:
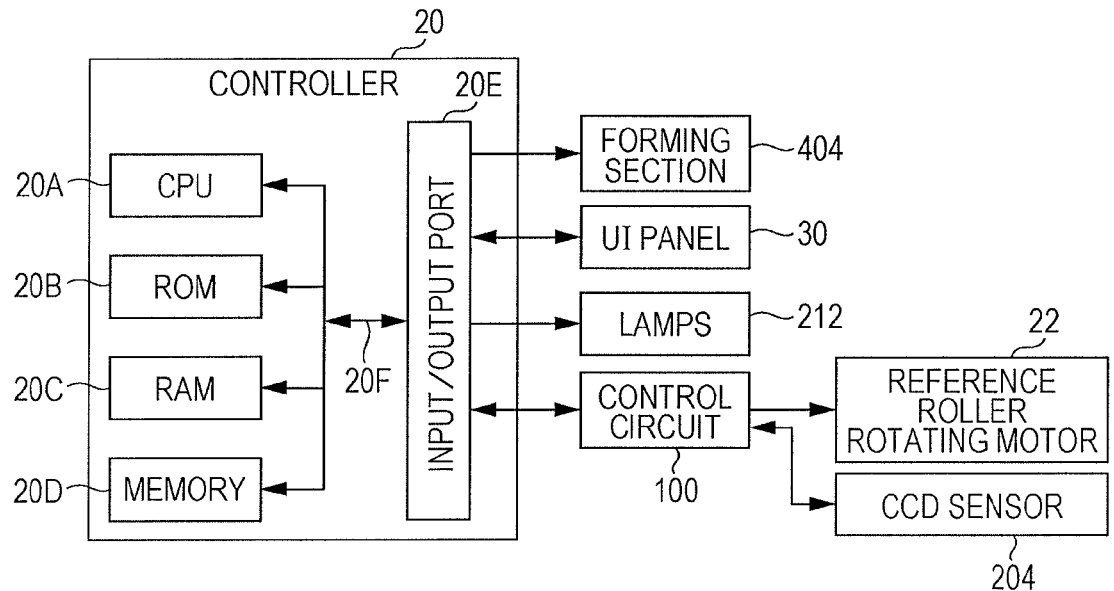
FIG. 3 is a block diagram of a structure of a principal portion of an electric system of a controller in the image forming apparatus according to the exemplary embodiment of the present invention.

Next, with reference to FIG. 3, a structure of a principal portion of an electric system of the controller 20 in the image forming apparatus 10 according to the exemplary embodiment of the present invention is described.

As shown in FIG. 3, the controller 20 according to the exemplary embodiment includes a central processing unit (CPU) 20A and read only memory (ROM) 20B. The CPU 20A controls the operations of the entire image forming apparatus 10. For example, various control programs and various parameters are previously stored in the ROM 20B. The controller 20 also includes random access memory (RAM) 20C that is used as, for example, a work area when various programs are executed by the CPU 20A. The controller 20 further includes a nonvolatile memory 20D (for example, a flash memory in the exemplary embodiment) and an input/output port 20E.

These portions are connected to each other via buses 20F, such as a control bus, an address bus, and a data bus. A forming section 404, a user interface (UI) panel 30, the lamps 212, and the control circuit 100 are connected to the input/output port 20E. A reference roller rotating motor 22 that rotationally drives the reference roller 226 and the CCD sensor 204 are connected to the control circuit 100.

The forming section 404 according to the exemplary embodiment includes structural components that perform various processing operations related to forming images in the aforementioned image forming process. The UI panel 30 according to the exemplary embodiment includes, for example, a touch panel display in which a transmissive touch panel is superimposed upon a display. Various types of information are displayed on a display surface of the display. When a user touches the touch panel, information and instructions are received. Although, in the exemplary embodiment, the UI panel 30 is used as a display and an operating unit, the display and the operating unit are not limited thereto. For example, a liquid crystal display may be used as the display, and a numeric keypad or an operating button may be used as the operating unit.

By virtue of the above-described structure, the forming section 404 performs the image forming process on the basis of an instruction from the CPU 20A. The CPU 20A ascertains information and instructions received by the UI panel 30 by obtaining them via the input/output port 20E and the buses 20F.

On the basis of the instructions from the CPU 20A, the on/off states (illumination/non-illumination states) of the lamps 212 are controlled. On the basis of an instruction from the CPU 20A, the control circuit 100 controls the driving of the reference roller rotating motor 22 to control switching between the surfaces of the reference roller 226. On the basis of an instruction from the CPU 20A, the control circuit 100 performs the above-described various calibrations of the in-line sensor 200.

However, in the image forming apparatus 10 according to the exemplary embodiment, the position where an image is formed on a sheet P may be shifted from an assumed position due to, for example, changes in environmental conditions (such as temperature and humidity) and changes in the states of the structural components in the apparatus with the passage of time. Similarly, for example, changes in the aforementioned environmental conditions and storage states may cause the size of sheets P to shift from a standard size, such as A4 or B4. In the description below, such a shift in position where an image is formed on a sheet P from an assumed position is simply called "positional shift", and such a shift in size of the sheet P from a standard size is simply called "size shift".

Therefore, the image forming apparatus 10 according to the exemplary embodiment is provided with a positional shift detection function for detecting the positional shift and a size shift detection function for detecting the size shift.

In the image forming apparatus 10 according to the exemplary embodiment, it is assumed that, as operation modes for executing these functions, either one of a first operation mode and a second operation mode is selectively applied. In the first operation mode, only the positional shift detection function is executed. In the second operation mode, both of the positional shift detection function and the size shift detection function are executed. However, the operation modes are not limited to these modes. As an operation mode, an operation mode for executing only the size shift detection function may be applied.

In the image forming apparatus 10 according to the exemplary embodiment, a first confirmation image L1 for executing the first operation mode is previously provided, and a second confirmation image L2 for executing the second operation mode is previously provided. Next, with reference to FIGS. 4 to 7D, the first confirmation image L1 and the second confirmation image L2 according to the exemplary embodiment are described in detail. When the first confirmation image L1 and the second confirmation image L2 are to be generically called, they are hereunder simply called "confirmation images".

Figure 4:
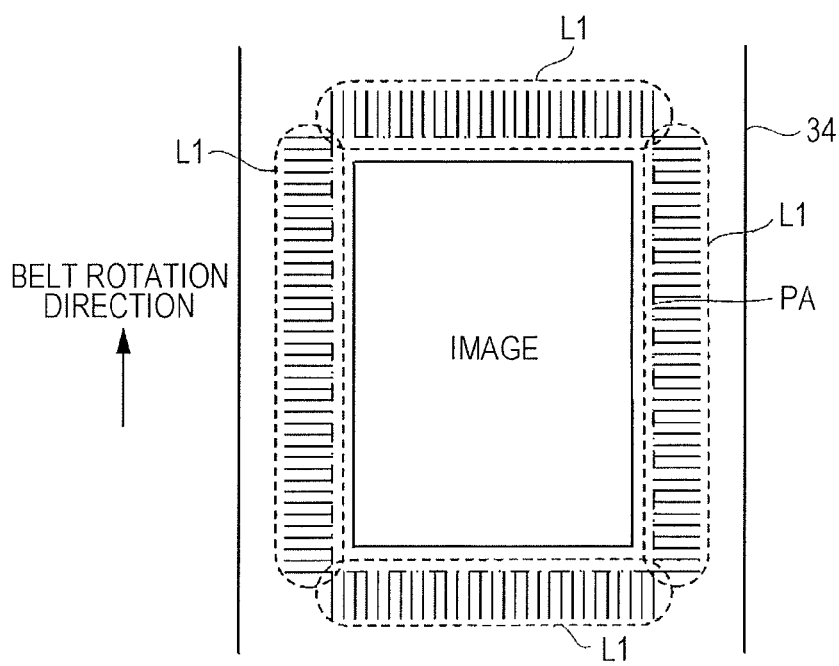
FIG. 4 illustrates first confirmation images according to the exemplary embodiment of the present invention.

FIG. 4 illustrates exemplary first confirmation images L1 according to the exemplary embodiment of the present invention. FIG. 4 shows the intermediate transfer belt 34 as seen from a bottom side in FIG. 1 at a position between the tension applying roller 41 and the opposing roller 42. In FIG. 4, a region corresponding to a region where an image to be formed is actually formed is represented by a solid rectangle, whereas a region PA corresponding to a region where transfer is performed on a sheet P when a positional shift does not occur is represented by an alternate-long-and-short-dash-line rectangle. In FIG. 4, the direction of rotation of the intermediate transfer belt 34 is represented by an arrow.

As shown in FIG. 4, the first confirmation images L1 according to the exemplary embodiment are images including multiple straight lines at sides of respective peripheral portions of the region PA. The straight lines extend in a direction that intersect (in the exemplary embodiment, is orthogonal to) a direction of extension of the corresponding side. The straight lines are formed along the direction of extension at a predetermined interval (such as 10 mm). That is, in the exemplary embodiment, as the first confirmation images L1, four ladder patterns are used. Here, the first confirmation images L1 include four ladder patterns so that an end of each straight line of each ladder pattern contacts its corresponding side of the region PA of the intermediate transfer belt 34 from an outer side. In the exemplary embodiment, the length of each straight line of each ladder pattern is a length that allows at least a portion to be formed at (transferred to) the corresponding peripheral portion of the sheet P even if a maximum amount of positional shift that is capable of occurring in the image forming apparatus 10 has occurred.

Figure 5A:
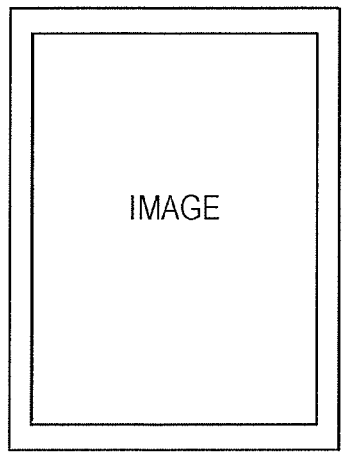
FIGS. 5A and 5B are used to illustrate a shift in an image formation position with respect to a sheet according to the exemplary embodiment of the present invention.
Figure 5B:
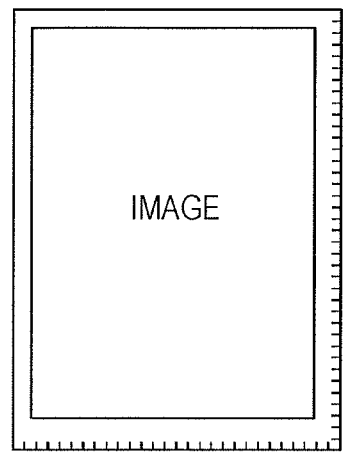

FIGS. 5A and 5B show an exemplary image on a sheet P that has been read by the in-line sensor 200. Here, FIG. 5A shows a case in which a positional shift has not occurred, whereas FIG. 5B shows a case in which a positional shift has occurred in an obliquely upper left direction in FIG. 4.

As shown in FIG. 5A, when a positional shift has not occurred, the first confirmation images L1 do not exist at any of the peripheral portions of the sheet P. In contrast, as shown in FIG. 5B, when a positional shift has occurred in an obliquely upper left direction in FIG. 4, portions of the first confirmation images L1 are formed in the peripheral portion at a right side and in the peripheral portion at a lower side of the sheet P in FIG. 5B in accordance with a positional shift amount IA. Therefore, from the lengths and positions of the first confirmation images L1, the positional shift amount IA and the positional shift direction are detected.

Figure 6:
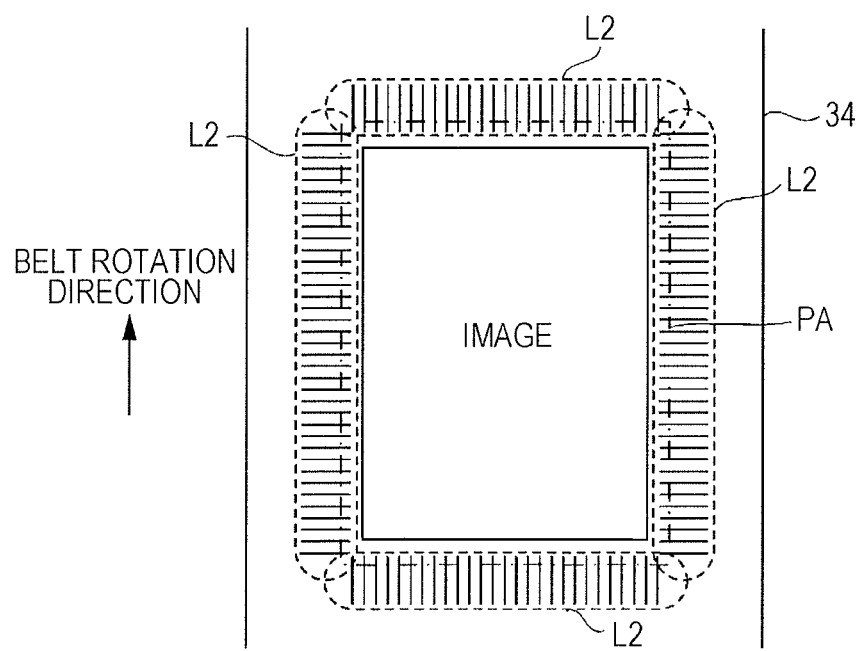
FIG. 6 illustrates second confirmation images according to the exemplary embodiment of the present invention.

FIG. 6 shows exemplary second confirmation images L2 according to the exemplary embodiment of the present invention. FIG. 6 shows the intermediate transfer belt 34 from the bottom side in FIG. 1 at a position between the tension applying roller 41 and the opposing roller 42.

As shown in FIG. 6, similarly to the first confirmation images L1, the second confirmation images L2 according to the exemplary embodiment are images including multiple straight lines at sides of respective peripheral portions of the region PA. The straight lines extend in a direction that intersect (in the exemplary embodiment, is orthogonal to) a direction of extension of the corresponding side. The straight lines are formed along the direction of extension at a predetermined interval (such as 10 mm). Here, unlike the first confirmation images L1, the second confirmation images L2 are such that a portion of one end of each straight line of each of four ladder patterns is formed in the corresponding peripheral portion of the region PA. Each straight line of the ladder pattern at the upper side of the region PA in FIG. 6 and each straight line of the ladder pattern at the lower side of the region PA in FIG. 6 are such that their positions in a left-right direction in FIG. 6 correspond with each other. Each straight line of the ladder pattern at the left side of the region PA in FIG. 6 and each straight line of the ladder pattern at the right side of the region PA in FIG. 6 are such that their positions in an up-down direction in FIG. 6 correspond with each other. Further, in the description below, as shown in FIGS. 7A to 7D below, a length of each straight line of each ladder pattern that is formed in the peripheral portion corresponding to its associated side of a sheet P when a positional shift and a size shift have not occurred is defined as r1.

In the exemplary embodiment, the length of each straight line that is formed on a sheet P when a positional shift and a size shift have not occurred is a length that allows at least a portion to be formed at (transferred to) the corresponding peripheral portion of the sheet P even if a maximum amount of positional shift that is capable of occurring in the image forming apparatus 10 and a maximum amount of expansion or contraction that is capable of occurring in the image forming apparatus 10 have occurred.

FIGS. 7A to 7D each show an exemplary image on a sheet P that has been read by the in-line sensor 200. FIGS. 7A to 7D each show a state in which an upper portion of the image on the sheet P is enlarged, and a ladder pattern that is formed at a peripheral portion at an upper side is not shown.

Figure 7A:
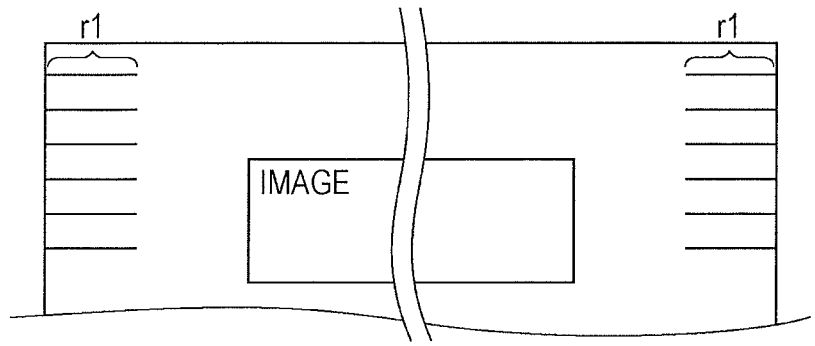
FIGS. 7A to 7D are used to illustrate shifts in an image formation position with respect to a sheet according to the exemplary embodiment of the present invention.
Figure 7B:
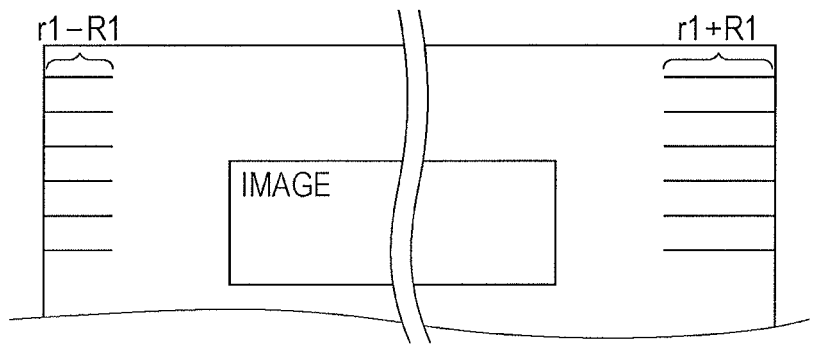
Figure 7C:
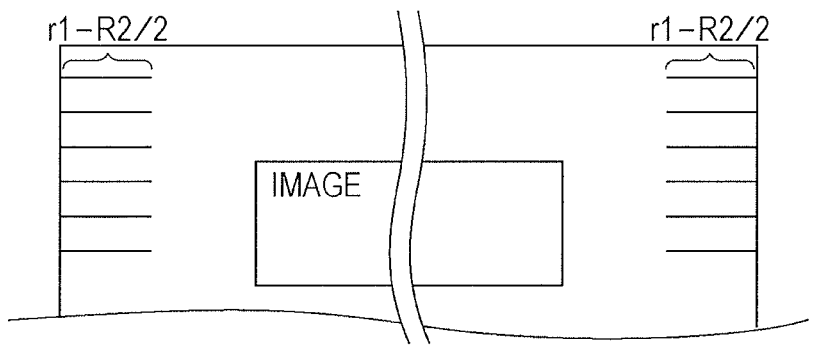
Figure 7D:
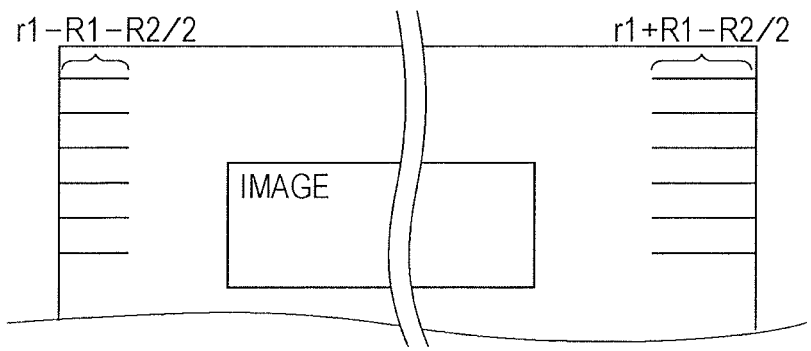

Here, FIG. 7A shows a case in which a positional shift and a size shift have not occurred, whereas FIG. 7B shows a case in which a positional shift has occurred in a left direction in FIG. 6 and a size shift has not occurred. FIG. 7C shows a case in which a positional shift has not occurred and a size shift has occurred in a left-right direction in FIG. 6. FIG. 7D shows a case in which a positional shift has occurred in the left direction in FIG. 6 and a size shift has occurred in the left-right direction in FIG. 6.

As shown in FIG. 7A, when a positional shift and a size shift have not occurred, each straight line of a second confirmation image L2 formed at a peripheral portion on the left side in FIG. 7A of the sheet P (hereunder referred to as "left straight line") is formed with a length r1. Further, in this case, each straight line of a second confirmation image L2 formed at a peripheral portion on the right side in FIG. 7A of the sheet P (hereunder referred to as "right straight line") and at a position corresponding to that of each left straight line in a vertical direction in FIG. 7A is also formed with the length r1.

As shown in FIG. 7B, when a positional shift has occurred by a length corresponding to a length R1 in the left direction in FIG. 6 and a size shift has not occurred, left straight lines having a length r1−R1 are formed and right straight lines having a length r1+R1 are formed. Therefore, in this case, the direction of the positional shift is detected on the basis of the relationship between the length of the left straight lines and the length of the right straight lines. In addition, in this case, the ratio between the length of the left straight lines and the length of the right straight lines is r1−R1:r1+R1, which differs from the ratio (r1:r1) when a positional shift and a size shift have not occurred. In this case, the sum of the length of the left straight lines and the length of the right straight lines is r1+r1, which is the same as the sum (r1+r1) when a positional shift and a size shift have not occurred. Further, in this case, as indicated by the following Formula (1), the positional shift amount IA is derived by subtracting the length of the right straight lines (left straight lines) when a positional shift and a size shift have not occurred from the length of the right straight lines (left straight lines):

$$IA = (r1+R1) - r1 = R1 \quad (1)$$

As shown in FIG. 7C, when a positional shift has not occurred and when a size shift in which the length is reduced by a length corresponding to a length R2 in the left-right direction in FIG. 6 has occurred, left straight lines having a length r1−R2/2 and right straight lines having a length r1−R2/2 are formed on a sheet P. In this case, the ratio between the length of the left straight lines and the length of the right straight lines is r1−R2/2:r1−R2/2, which is the same as the ratio (r1:r1) when a positional shift and a size shift have not occurred. In this case, the sum of the length of the left straight lines and the length of the right straight lines is r1+r1−R2, which differs from the sum (r1+r1) when a positional shift and a size shift have not occurred. Further, as indicated by the following Formula (2), a size shift amount SA is derived by subtracting the sum when a positional shift and a size shaft have not occurred from the sum of the length of the left straight lines and the length of the right straight lines:

$$SA = (r1+r1-R2) - (r1+r1) = -R2 \quad (2)$$

As indicated by the following Formula (3), a size shift multiplication factor SB is derived by dividing the sum of the size shift amount SA and a size PS of a sheet P in a left-right direction in FIG. 7 by the size PS of the sheet P:

$$SB = (PS + SA) \div PS = \frac{PS - R2}{PS} \quad (3)$$

Further, as shown in FIG. 7D, when a positional shift has occurred by a length corresponding the length R1 in the left direction in FIG. 6 and a size shift in which the length is reduced by a length corresponding to the length R2 in the left-right direction in FIG. 6 has occurred, left straight lines having a length r1−R1−R2/2 and right straight lines having a length r1+R1−R2/2 are formed on a sheet P. In this case, the ratio between the length of the left straight lines and the length of the right straight lines is r1−R1−R2/2:r1+R1−R2/2, which differs from the ratio (r1:r1) when a positional shift and a size shift have not occurred. In this case, the sum of the length of the left straight lines and the length of the right straight lines is r1+r1−R2, which differs from the sum (r1+r1) when a positional shift and a size shift have not occurred. Using the aforementioned Formula (2), the size shift amount SA is derived. Using the aforementioned Formula (3), the size shift multiplication factor SB is derived. As indicated by the following Formula (4), the positional shift amount IA is derived by subtracting ½ of the size shift amount SA and the length of the right straight lines (left straight lines) when a positional shift and a size shift have not occurred from the length of the right straight lines (left straight lines):

$$IA = \left(r1 + R1 - \frac{R2}{2}\right) - r1 - \left(-\frac{R2}{2}\right) = R1 \quad (4)$$

Although, in the exemplary embodiment, as the confirmation images described above, images having densities that are less than or equal to a predetermined density (such as yellow images) are used, the confirmation images are not limited thereto, so that images having other densities may be used. In addition, the reading sensitivity of the in-line sensor 200 may be increased with decreasing density of the confirmation images by, for example, changing the light quantity of the lamps 212 of the in-line sensor 200 in accordance with the density of the confirmation images.

Figures 8, 9:
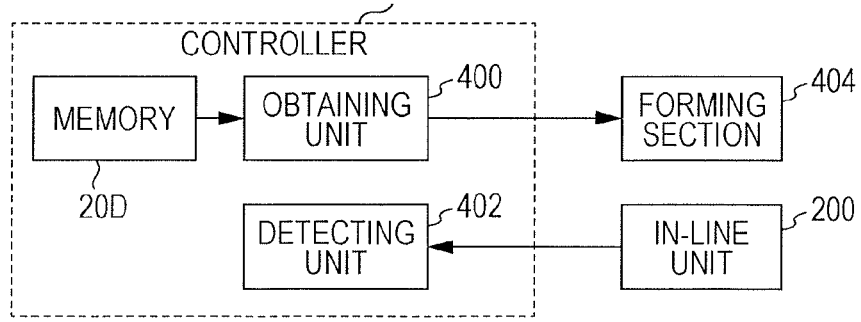
FIG. 8 is a schematic view of an example of confirmation image information according to the exemplary embodiment of the present invention.
FIG. 9 is a functional block diagram of a functional structure of the image forming apparatus according to the exemplary embodiment of the present invention.

In the image forming apparatus 10 according to the exemplary embodiment, the aforementioned first confirmation images L1 and second confirmation images L2 are previously stored in the memory 20D as confirmation image information as schematically shown as examples in FIG. 8.

As shown in FIG. 8, in the confirmation image information according to the exemplary embodiment, the first confirmation images L1 and the second confirmation images L2 are individually stored in the memory 20D in accordance with each size of a sheet used in forming images and in accordance with vertical placement/horizontal placement of sheets (simply referred to as "vertical/horizontal" in FIG. 8). "Length within sheet" in FIG. 8 refers to information indicating the length of each straight line of each second confirmation image L2 that is formed on a sheet P even when a positional shift and a size shift have not occurred.

Although, in the image forming apparatus 10 according to the exemplary embodiment, image information itself of each confirmation image is stored as confirmation image information, for example, pieces of information indicating storage positions of corresponding pieces of image information may be used instead of the pieces of image information themselves.

Next, with reference to FIG. 9, the structure of the image forming apparatus 10 when the positional shift detection function and the size shift detection function are executed according to the exemplary embodiment is described. FIG. 9 is a functional block diagram of a functional structure of the image forming apparatus 10 in this case.

As shown in FIG. 9, the image forming apparatus 10 according to the exemplary embodiment includes an obtaining unit 400, a detecting unit 402, and the forming section 404.

The obtaining unit 400 according to the exemplary embodiment obtains pieces of image information provided for forming confirmation images having formation states at peripheral portions of the sheet P that differ when an image that is formed on a sheet P is at an assumed position from when the image on the sheet is shifted from the assumed position. More specifically, from the memory 20D, the obtaining unit 400 according to the exemplary embodiment obtains information for forming first confirmation images L1 or second confirmation images L2 in accordance with the size of the sheet P and vertical placement/horizontal placement. In the exemplary embodiment, information about the size of the sheet P and information about the vertical placement/horizontal placement are obtained from information added to information indicating instructions for starting image formation. The forming section 404 according to the exemplary embodiment forms images by using the image information obtained by the obtaining unit 400.

As mentioned above, the in-line sensor 200 outputs a signal that is in accordance with an image obtained by reading the sheet P. The detecting unit 402 according to the exemplary embodiment receives the signal output from the in-line sensor 200, and, on the basis of the signal, detects a positional shift state and a size shift state.

As mentioned above, when the image forming apparatus 10 operates in the first operation mode, the detecting unit 402 according to the exemplary embodiment detects the positional shift amount IA and the positional shift direction on the basis of the length and the position of formation of each straight line of each first confirmation image L1 formed at the corresponding peripheral portion of the sheet P.

In contrast, when the image forming apparatus 10 operates in the second operation mode, on the basis of the lengths of straight lines of the second confirmation images L2 formed on the left and right sides of the sheet P and whose positions correspond with each other in the vertical direction when a positional shift and a size shift have not occurred and when at least one of the positional shift and size shift has occurred, and on the basis of the lengths of straight lines of the second confirmation images L2 formed on the upper and lower sides of the sheet P and whose positions correspond with each other in the left-right direction when a positional shift and a size shift have not occurred and when at least one of the positional shift and size shift has occurred, the detecting unit 402 according to the exemplary embodiment detects the positional shift amount IA, the positional shift direction, the size shift multiplication factor SB, and the size shift direction at the position of each straight line.

The processing operations by each of the detecting unit 402 and the obtaining unit 400 of the image forming apparatus 10 (structural elements) having the above-described structure may be achieved by a software configuration using a computer as a result of executing a program. However, it goes without saying that the processing operations may be achieved by something other than a software configuration, such as a hardware configuration or a combination of a hardware configuration and a software configuration. An example of a case in which each structural element performs the processing operations using a hardware configuration consists in forming functional elements that execute the same processing operations as the structural elements and using the functional elements.

The case in which each structural element performs the processing operations by executing the aforementioned program is hereunder described. In this case, the corresponding program may be previously installed in the image forming apparatus 10, the corresponding program may be provided while being stored in a computer readable recording medium, or the corresponding program may be distributed by a communication unit by wire or radio.

Next, the operation of the image forming apparatus 10 according to the exemplary embodiment is described with reference to FIGS. 10 to 12.

Figure 10:
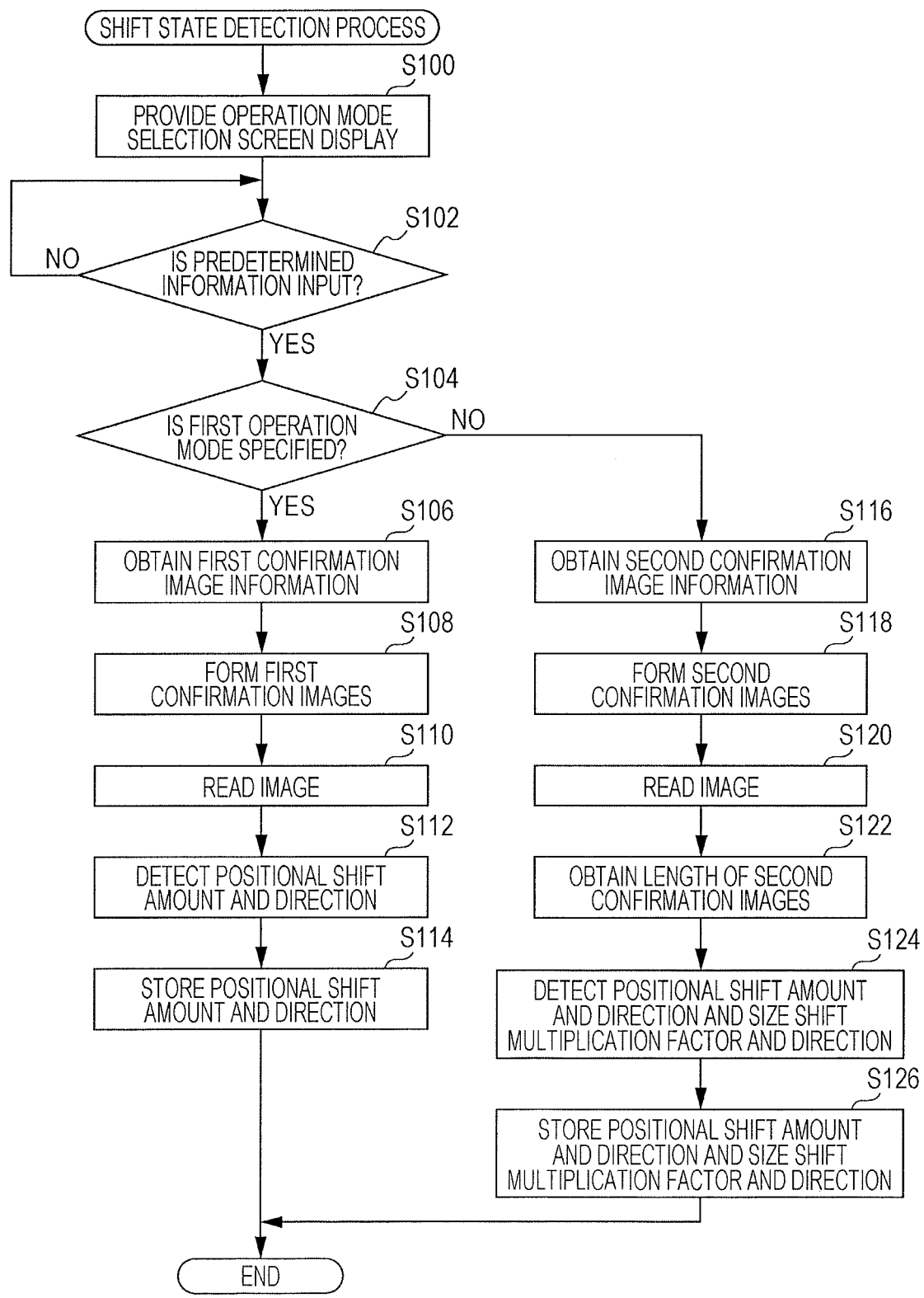
FIG. 10 is a flowchart of steps of a shift state detection program according to the exemplary embodiment of the present invention.

First, with reference to FIG. 10, the operation of the image forming apparatus 10 when either one of the aforementioned first operation mode and the second operation mode is selectively executed is described. FIG. 10 is a flowchart of steps of a shift state detection program that is executed by the CPU 20A when a power switch of the image forming apparatus 10 is turned on. In the exemplary embodiment, the program is previously stored in the ROM 20B. In the exemplary embodiment, a timing in which the program is executed corresponds to a timing in which the power switch is turned on. However, the timing is not limited thereto. For example, the timing may correspond to a timing in which an instruction for starting detection of a positional shift and a size shift via, for example, the UI panel 30 is received. The timing may also correspond to a timing in which each job (one image forming process) ends. In one job, images are formed on the number of sheets P that is greater than or equal to a predetermined number of sheets P (such as 1000 sheets P).

In Step S100 in FIG. 10, the CPU 20A controls the UI panel 30 so as to provide an operation mode selection screen display that has been predeterminately formatted. Then, in the next Step S102, the CPU 20A waits for an input of predetermined information.

FIG. 11 shows an exemplary state of display on the operation mode selection screen. As shown in FIG. 11, regions A1 and A2 for specifying pieces of information indicating desired operation modes (first operation mode and second operation mode in the exemplary embodiment), respectively, are displayed along with the respective operation modes on the operation mode selection screen according to the exemplary embodiment.

If the operation mode selection screen display shown in FIG. 11 is provided on the UI panel 30, when a user is to execute the first operation mode, the user performs a pointing specifying operation on the region A1 with, for example, a finger tip. After performing the pointing specifying operation on the region A1, the user performs a pointing specifying operation on an end button that is display near a lower end portion of the operation mode selection screen. In contrast, when the user is to execute the second operation mode, after the user has performed a pointing specifying operation on the region A2, the user performs a pointing specifying operation on the end button. When the user has performed the pointing specifying operation on the end button, it is determined that the predetermined information has been input in Step S102, and the CPU 20A proceeds to Step S104.

In Step S104, on the basis of the result of the specification performed at the operation mode selection screen, the CPU 20A determines whether or not only a positional shift of a detection object has occurred by determining whether or not the first operation mode has been specified on the operation mode selection screen. When the CPU 20A determines that only a positional shift of a detection object has occurred, the process proceeds to Step S106.

In Step S106, the CPU 20A reads from the memory 20D information (hereunder referred to as "first confirmation image information") for forming first confirmation images in accordance the size of a sheet P and vertical placement/horizontal placement, to obtain the first confirmation image information. In the next Step S108, the CPU 20A uses the first confirmation image information obtained by the operation in Step S106, to perform control on the forming section 404 to cause it to form the first confirmation images.

In the next Step S110, the CPU 20A performs control on the in-line sensor 200 that causes the in-line sensor 200 to read the sheet P with the detection reference surface 228 facing the transport path 60, so that an image read by the in-line sensor 200 is obtained. In the next Step S112, as mentioned above, the CPU 20A detects the positional shift amount IA and the positional shift direction on the basis of the length and position of formation of each straight line of each first confirmation image at a corresponding peripheral portion of the image obtained by the operation in Step S110. In the next Step S114, the CPU 20A stores in the memory 20D the positional shift amount IA and the positional shift direction detected by the operation in Step S112. Then, the actual shift state detection program ends.

In contrast, when, in the aforementioned Step S104, the CPU 20A determines that the first operation mode has not been specified, the process proceeds to Step S116. In Step S116, the CPU 20A reads out from the memory 20D image information for forming second confirmation images (hereunder referred to as "second confirmation image information) in accordance with the size of the sheet P and vertical placement/horizontal placement, and obtains the second confirmation image information. In the next Step S118, the CPU 20A uses the second confirmation image information obtained by the operation in the aforementioned Step S116, to perform control on the forming section 404 to cause the forming section 404 to form the second confirmation images.

In the next Step S120, as in the operation in Step S110, the CPU 20A obtains an image of the sheet P that has been read by the in-line sensor 200. In the next Step S122, the CPU 20A reads out from the memory 20D information indicating the aforementioned length within the sheet P of the second confirmation images and stored in association with the second confirmation image information obtained by the operation in the aforementioned Step S116. In the next Step S124, as mentioned above, the CPU 20A detects the positional shift amount IA and the positional shift direction and the size shift multiplication factor SB and the size shift direction on the basis of the length of each straight line of each second confirmation image at the corresponding peripheral portion of the image obtained by the operation in Step S120 and the information obtained by the operation in the aforementioned Step S122. In the next Step S126, the CPU 20A stores in the memory 20D the positional shift amount IA and the positional shift direction and the size shift multiplication factor SB and the size shift direction detected by the operation in the aforementioned Step S124. Thereafter, the actual shift state detection program ends.

Next, the operation of the image forming apparatus 10 when an ordinary image forming process is performed is described with reference to FIG. 12. FIG. 12 is a flowchart of steps of an image formation program that is executed by the CPU 20A when image information indicating an image to be formed (hereunder referred to as "image information to be processed") is received from an external device. In the exemplary embodiment, the program is previously stored in the ROM 20B.

In Step S200 in FIG. 12, the CPU 20A reads out the positional shift amount IA and the positional shift direction from the memory 20D. In the next Step S202, the CPU 20A generates positional-shift-corrected image information by performing image processing on the image information to be processed to correct a positional shift of the positional shift amount IA with respect to the positional shift direction that has been read out by the operation in the aforementioned Step S200. In the exemplary embodiment, as the image processing that corrects the positional shift, image processing that causes an image to undergo parallel movement by an amount equivalent to the positional shift amount IA in a direction opposite to the direction of the positional shift is applied.

In the next Step S204, the CPU 20A reads out the size shift multiplication factor SB and the size shift direction from the memory 20D. In the next Step S206, the CPU 20A determines whether or not the size shift multiplication factor SB and the size shift direction have been read out by the operation in the aforementioned Step S204. When the CPU 20A determines that they have been read, the process proceeds to Step S208, whereas when the CPU 20A determines that they have not been read, the process proceeds to Step S210.

In Step S208, the CPU 20A generates size-shift corrected-image information by performing image processing on the image information generated by the operation in the aforementioned Step S202 to correct a size shift of an amount equivalent to the size shift multiplication factor SB with respect to the size shift direction obtained by the operation in the aforementioned Step S204. In the exemplary embodiment, as the image processing that corrects the size shift, image processing that contracts or enlarges the image by a multiplication factor corresponding to the size shift multiplication factor SB with respect to the size shift direction is applied.

In Step S210, the CPU 20A uses the image information generated by the above-described processing operations, to perform control on the forming section 404 to cause the forming section 404 to form an image, and ends the actual image formation program.

Although the exemplary embodiment is described above, the technical scope of the present invention is not limited to the above-described exemplary embodiment. Various changes and modifications may be made to the exemplary embodiment within a scope that does not depart from the gist of the present invention, so that practical forms to which changes and modifications are made are included within the technical scope of the present invention.

The above-described exemplary embodiment does not limit the claimed inventions. Not all combinations of the features described in the exemplary embodiment are necessary to addressing the problems according to the present invention. Inventions of various phases are included in the above-described exemplary embodiment, and such various inventions are obtained on the basis of combinations of disclosed structural features. Even if some of the structural features according to the exemplary embodiment are omitted, structures in which some of the structural features are omitted are capable of being achieved as inventions as long as the effects are capable of being provided.

For example, although, in the above-described exemplary embodiment, the case in which a positional shift and a size shift are detected by the image forming apparatus 10 is described, the present invention is not limited thereto. For example, it is possible for a user to ascertain at least one of the positional shift and the size shift by viewing a sheet P on which confirmation images similar to those according to the exemplary embodiment are formed.

Although, in the above-described exemplary embodiment, the case in which a sheet P is rectangular is described, the present invention is not limited thereto. For example, the sheet P may have other shapes such as a polygonal shape or a circular shape.

Figure 13A:
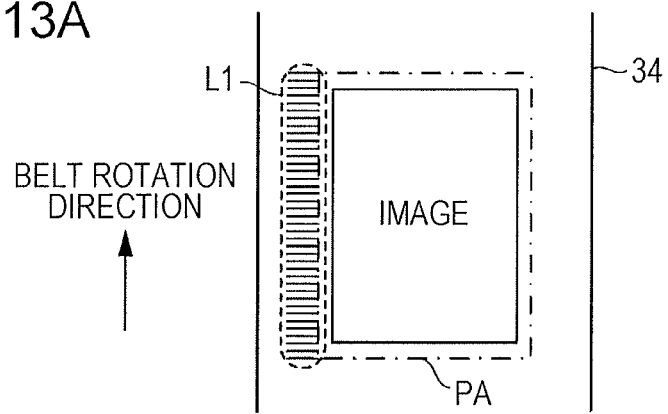
FIGS. 13A to 13C illustrate a confirmation image or confirmation images according to other exemplary embodiments of the present invention.
Figure 13B:
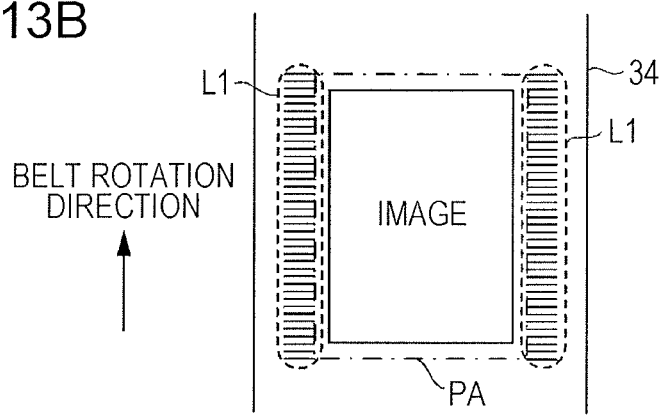
Figure 13C:
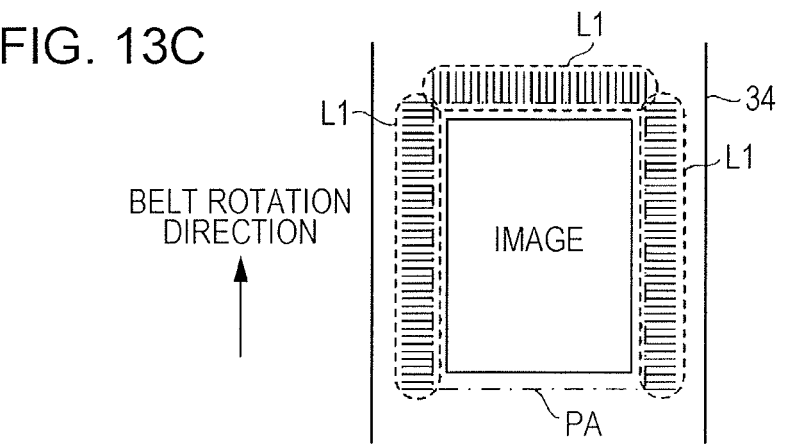

Although, in the exemplary embodiment, the case in which four peripheral portions corresponding to four sides of a sheet P are used as the regions of a sheet P on which first confirmation images L1 are formed when a positional shift has occurred, the present invention is not limited thereto. For example, as shown in FIG. 13A to 13C, at least one of the four peripheral portions may be used as such a region or regions. FIG. 13A shows a case in which one peripheral portion is used. FIG. 13B shows a case in which two peripheral portions are used. FIG. 13C shows a case in which three peripheral portions are used.

Although, in the exemplary embodiment, the case in which only confirmation images are formed and positional shift and size shift are detected is described, the present invention is not limited thereto. For example, at the same time that an ordinary image forming process is performed, confirmation images similar to those according to the exemplary embodiment may be formed. In this case, confirmation images may be formed on a sheet P in addition to the aforementioned ordinary images. However, since the confirmation images are formed at the peripheral portions of the sheet P, the influence of such confirmation images is small.

Therefore, in order to detect a positional shift and a size shift, the probability with which a user is prevented from ordinarily using the image forming apparatus 10 is low, as a result of which a reduction in productivity is suppressed. Further, in this case, an area of a sheet P where there is a possibility that a confirmation image is formed may be cut by a cutting unit that is provided between the in-line sensor 200 and each discharge roller 198 of the image forming apparatus 10. This prevents the confirmation image on the sheet P from finally remaining thereon.

Although, in the exemplary embodiment, the case in which ladder patterns are used as confirmation images is described, the present invention is not limited thereto. For example, as confirmation images, images having different shades of color, such as halftone images, may be used. In such a case, long halftone images whose width in a short-side direction is equivalent to the length of a ladder pattern according to the above-described embodiment are exemplified. In such a case, when the width of such halftone images in the short-side direction is used instead of the length of each straight line of a confirmation image according to the above-described embodiment, at least one of a positional shift and a size shift is detected.

Figure 14:
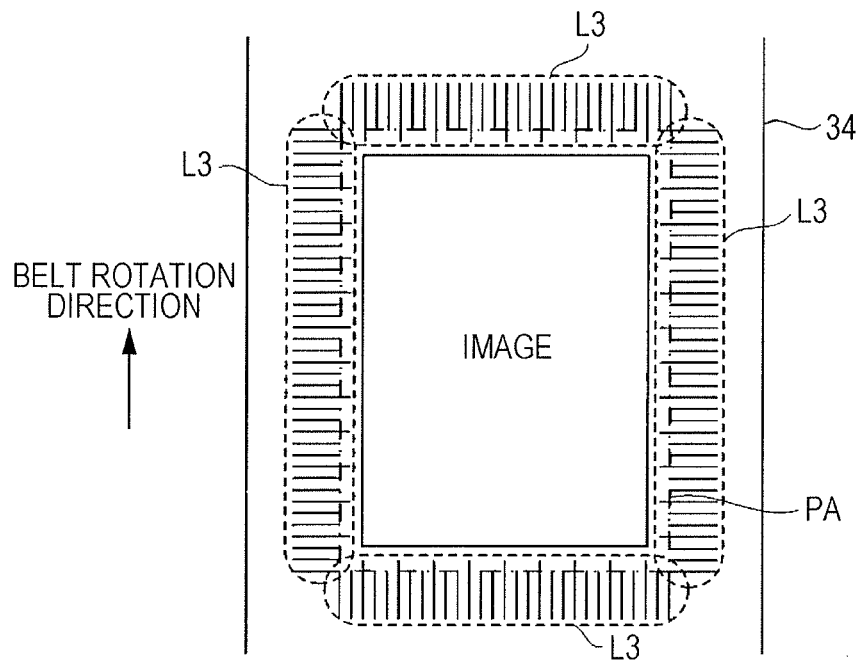
FIG. 14 illustrates confirmation images according to still another exemplary embodiment of the present invention.

Although, in the above-described exemplary embodiment, as confirmation images, confirmation images used in the first operation mode and those used in the second operation mode that differ from each other are used, the present invention is not limited thereto. For example, common confirmation images may be used in the first operation mode and the second operation mode. In this case, as shown in FIG. 14, as confirmation images, confirmation images L3 in which straight lines similar to those of a first confirmation image L1 and straight lines similar to those of a second confirmation image L2 are periodically used at a predetermined ratio with respect to an arrangement direction are exemplified. In this case, in the first operation mode, the positional shift amount IA and the positional shift direction are detected by operations similar to those according to the exemplary embodiment on the basis of the length and position of formation of straight lines similar to those of the first confirmation image L1 formed on a sheet P. Further, in this case, in the second operation mode, the positional shift amount IA and the positional shift direction and the size shift multiplication factor SB and the size shift direction are detected by operations similar to those according to the exemplary embodiment on the basis of the length of straight lines similar to those of the second confirmation image L2 formed on the sheet P.

Although, in the exemplary embodiment, prior to detecting a positional shift and a size shift, the in-line sensor 200, provided in the housing of the image forming apparatus 10, reads an image on a sheet P, the present invention is not limited thereto. For example, an image reading device, such as a scanner, provided outside of the housing of the image forming apparatus 10 may read an image on a sheet P.

Although, in the exemplary embodiment, the positional shift amount IA and the positional shift direction and the size shift multiplication factor SB and the size shift direction are detected, the present invention is not limited thereto. For example, the presence/absence of the positional shift and the presence/absence of the size shift may be detected. In this case, a practical form in which the presence/absence of the positional shift and the presence/absence of the size shift are detected on the basis of, for example, whether or not the positional shift amount IA and the size shift amount SA are outside predetermined ranges is exemplified. Further, in this case, a practical form in which the presence/absence of the detected positional shift and the presence/absence of the detected size shift are displayed on a display, such as the UI panel 30, is exemplified.

Figure 15:
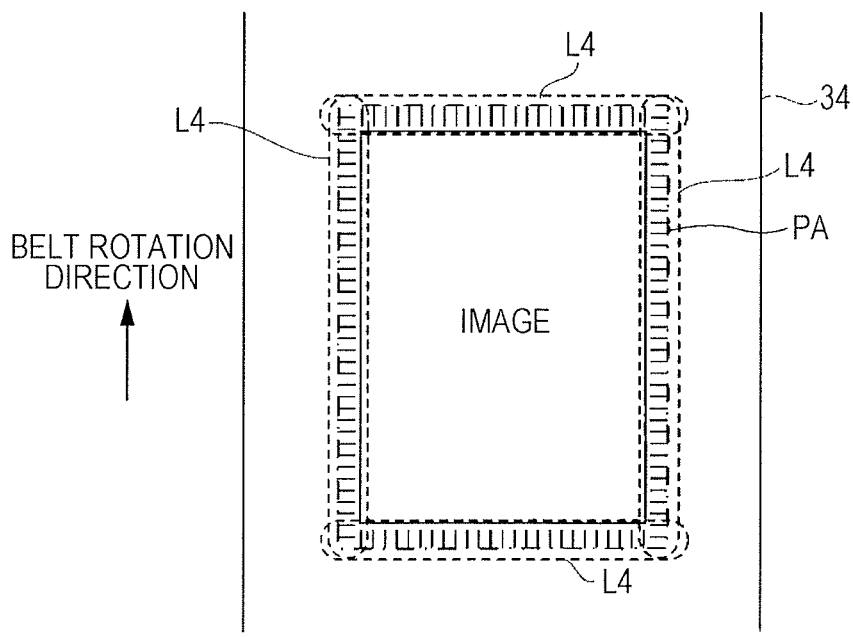
FIG. 15 illustrates confirmation images according to still another exemplary embodiment of the present invention.

In the exemplary embodiment, the case in which, as confirmation images that are used in the first operation mode, the first confirmation images L1 (see FIG. 4) that are formed at the outer sides of the region PA and that are not formed at the peripheral portions of the region PA of the intermediate transfer belt 34 are used is described. However, the present invention is not limited thereto. For example, as shown in FIG. 15, as confirmation images, first confirmation images L4 that are not formed at the outer sides of the region PA of the intermediate transfer belt 34 and that are formed at the peripheral portions of the region PA may be used. This reduces the quantity of toner images remaining on the intermediate transfer belt 34 after the second-transfer of the toner images to a sheet P. In this case, the positional shift amount IA is derived by subtracting the length of each straight line when a positional shift does not occur from the length of each straight line formed on the corresponding peripheral portion of the sheet P when a positional shift occurs. The positional shift direction is detected on the basis of the position of formation of each straight line whose length has been changed by the positional shift.

Further, in this case, when a positional shift has occurred, a portion of each straight line of each first confirmation image L4 having a length that is in accordance with the shift amount remains as a toner image on the intermediate transfer belt 34 without being second-transferred to the sheet P at the transfer position T. Therefore, for example, a sensor that reads the toner images on the intermediate transfer belt 34 is provided at a position opposing the wind roller 44 with the intermediate transfer belt 34 being nipped therebetween at a location between the second transfer roller 62 and the removing device 46 shown in FIG. 1. There is exemplified a case in which, on the basis of the reading results provided by the sensor, the length and the remaining position of each straight line of each toner image remaining on the intermediate transfer belt 34 are detected when a positional shift has occurred, to detect the positional shift amount IA and the positional shift direction.

Although not particularly specified in the exemplary embodiment, when the ratio of the remaining amount of toner used for forming confirmation images becomes less than or equal to a predetermined threshold value (such as 20%), it is possible to reduce the quantity of confirmation images that are formed by, for example, reducing the number of straight lines of ladder patterns or reducing the length of the straight lines.

Although, in the exemplary embodiment, the case in which a positional shift is corrected by performing image processing is described, the present invention is not limited thereto. For example, a positional shift may be corrected by changing, for example, the transport position of a sheet P in the main scanning direction, the transport speed, or a timing in which the sheet P is fed from each of the recording medium containers 48.

Although, in the exemplary embodiment, confirmation images are formed using image information obtained from the memory 20D, the present invention is not limited thereto. For example, confirmation images may be formed by using image information obtained via communication lines from an external device, such as a server computer. In addition, for example, confirmation images may be formed by using information specified by a user via, for example, the UI panel 30, the information being about, for example, the shape, length, position of formation, and density of the confirmation images.

Although, in the exemplary embodiment, the case in which a positional shift in a vertical direction or a horizontal direction in FIG. 4 is detected is described, the present invention is not limited thereto. For example, even when an image is formed in a rotated state in a plane direction in FIG. 4 (that is, even when an image is formed so as to be obliquely shifted with respect to a sheet P), a positional shift may be detected by a process similar to the process of detecting a positional shift in the exemplary embodiment. In this case, for example, the positional shift amount IA and a rotation direction of the image are detected on the basis of the length of straight lines of first confirmation images L1 at peripheral portions at respective sides of the sheet P.

Although, in the exemplary embodiment, an image forming apparatus using an electrophotographic system is used as the image forming apparatus 10, the present invention is not limited thereto. For example, as the image forming apparatus 10, an image forming apparatus using an inkjet system may be used.

The structure of the image forming apparatus described in the exemplary embodiment (refer to FIGS. 1 to 3) is an example. It goes without saying that unnecessary portions may be omitted or new portions may be added within a scope that does not depart from the gist of the present invention.

The flowcharts of the steps of the various programs that are described in the exemplary embodiment (see FIGS. 10 and 12) are examples. Unnecessary steps may be omitted, new steps may be added, and the order of steps may be changed within a scope that does not depart from the gist of the present invention.

It goes without saying that the structure of the operation mode selection screen described in the exemplary embodiment is an example (see FIG. 11). Part of the information may be omitted, new information may be added, and display positions may be changed within a scope that does not depart from the gist of the present invention.

Further, the structure of the confirmation image information described in the exemplary embodiment (see FIG. 8) is an example. Part of the information may be omitted, new information may be added, and storage positions may be changed within a scope that does not depart from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a controller configured to obtain image information stored in a memory in the controller for forming a confirmation image, a state of formation of the confirmation image at a peripheral portion of a recording medium when an image formation position with respect to the recording medium is a predetermined position differing from a state of formation of the confirmation image at the peripheral portion of the recording medium when the image formation position is shifted from the predetermined position; and a processor that, when ascertaining the shift of the image formation position from the predetermined position, is configured to perform an image forming process using the image information obtained by the controller, wherein, when the image formation position is the predetermined position, the confirmation image is an image that is not formed at the peripheral portion, and wherein, when the image formation position is shifted from the predetermined position, the confirmation image is an image that is formed at the peripheral portion.

2. The image forming apparatus according to claim 1, wherein the recording medium is rectangular, and wherein, when the confirmation image is formed on the recording medium, the confirmation image is an image that is formed at at least one of the peripheral portions of the recording medium.

3. The image forming apparatus according to claim 1, further comprising:

a sensor that reads the image at the peripheral portion; and the controller is configured to detect a state of the shift of the image formation position from the predetermined position on the basis of the image at the peripheral portion read by the sensor.

4. The image forming apparatus according to claim 3, wherein the confirmation image is an image whose state of the formation at the peripheral portion when the image formation position is the predetermined position differs from the state of the formation at the peripheral portion when the image formation position is shifted from the predetermined position, and whose state of the formation at the peripheral portion changes when the recording medium is expanded or contracted, and wherein the controller is configured to detect the state of the shift of the image formation position from the predetermined position and an expansion or a contraction state of the recording medium, on the basis of the image at the peripheral portion read by the sensor.

5. The image forming apparatus according to claim 1, wherein the recording medium is rectangular, and wherein the confirmation image is an image including a plurality of straight lines that extend in a direction that intersects a direction of extension of an edge of the peripheral portion and that are formed along the direction of extension of the edge at a predetermined interval.

6. The image forming apparatus according to claim 1, wherein the confirmation image is an image whose density is less than or equal to a predetermined density.

7. The image forming apparatus according to claim 1, wherein a quantity of the confirmation image that is formed at the peripheral portion when the image formation position is the predetermined position differs from a quantity of the confirmation image that is formed at the peripheral portion when the image formation position is shifted from the predetermined position.

8. The image forming apparatus according to claim 1, wherein, when the image formation position is shifted from the predetermined position, the confirmation image is an image whose quantity at the peripheral portion differs in accordance with an amount of shift of the image formation position from the predetermined position.

* * * * *